US012602329B2

(12) United States Patent
Ingalls et al.

(10) Patent No.: US 12,602,329 B2
(45) Date of Patent: Apr. 14, 2026

(54) ATOMIC MEMORY OPERATIONS FOR ADDRESS TRANSLATION

(71) Applicant: SiFive, Inc., San Mateo, CA (US)

(72) Inventors: John Ingalls, Mountain View, CA (US); Andrew Waterman, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/475,310

(22) Filed: Sep. 27, 2023

(65) Prior Publication Data

US 2024/0104024 A1 Mar. 28, 2024

Related U.S. Application Data

(60) Provisional application No. 63/411,094, filed on Sep. 28, 2022.

(51) Int. Cl.
*G06F 12/1009* (2016.01)

(52) U.S. Cl.
CPC .................................. *G06F 12/1009* (2013.01)

(58) Field of Classification Search
CPC ......... G06F 12/1009; G06F 2212/1052; G06F 12/145; G06F 12/1081; G06F 2212/1016
See application file for complete search history.

(56) References Cited

U.S. PATENT DOCUMENTS

| | | | | | |
|---|---|---|---|---|---|
| 5,680,565 | A | * | 10/1997 | Glew .................. | G06F 12/1027 |
| | | | | | 712/E9.05 |
| 6,141,734 | A | * | 10/2000 | Razdan ............... | G06F 9/30087 |
| | | | | | 711/144 |
| 11,620,233 | B1 | * | 4/2023 | Habusha ............. | G06F 12/0891 |
| | | | | | 711/207 |
| 12,164,445 | B1 | * | 12/2024 | Naaman .............. | G06F 13/1668 |
| 2010/0011188 | A1 | * | 1/2010 | Eddy ........................ | G06F 9/383 |
| | | | | | 711/E12.002 |
| 2014/0337585 | A1 | * | 11/2014 | Grisenthwaite ..... | G06F 12/1475 |
| | | | | | 711/152 |
| 2015/0378777 | A1 | * | 12/2015 | Gschwind ............... | G06F 9/467 |
| | | | | | 711/147 |
| 2017/0097896 | A1 | * | 4/2017 | Molnar ................. | G06F 12/145 |
| 2020/0310972 | A1 | * | 10/2020 | Shanbhogue ............. | H04L 9/30 |
| 2024/0126702 | A1 | * | 4/2024 | Dechene ............. | G06F 12/0895 |
| 2024/0320002 | A1 | * | 9/2024 | Lawlor ................... | G06F 12/02 |

* cited by examiner

*Primary Examiner* — Sean D Rossiter
(74) *Attorney, Agent, or Firm* — Kilpatrick Townsend & Stockton LLP

(57) ABSTRACT

Systems and methods are disclosed for atomic memory operations for address translation. For example, an integrated circuit (e.g., a processor) for executing instructions includes a memory system including random access memory; a bus connected to the memory system; and an atomic memory operation circuitry configured to receive a request from the bus to access an entry in a page table stored in the memory system, wherein the request includes an indication of whether an instruction that references an address being translated using the entry is a store instruction; access the entry in the page table; responsive to the indication indicating that the instruction is a store instruction, set a dirty bit of the entry in the page table; and transmit contents of the entry on the bus in response to the request.

18 Claims, 9 Drawing Sheets

400

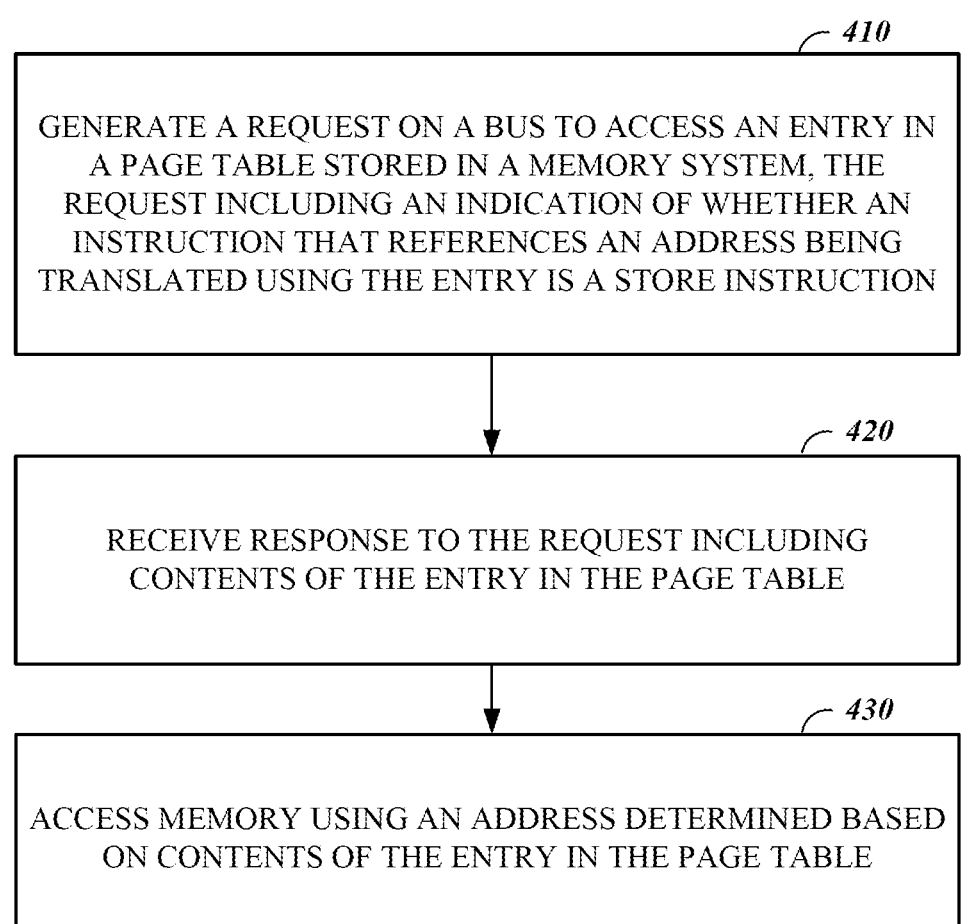

*410*

GENERATE A REQUEST ON A BUS TO ACCESS AN ENTRY IN A PAGE TABLE STORED IN A MEMORY SYSTEM, THE REQUEST INCLUDING AN INDICATION OF WHETHER AN INSTRUCTION THAT REFERENCES AN ADDRESS BEING TRANSLATED USING THE ENTRY IS A STORE INSTRUCTION

*420*

RECEIVE RESPONSE TO THE REQUEST INCLUDING CONTENTS OF THE ENTRY IN THE PAGE TABLE

*430*

ACCESS MEMORY USING AN ADDRESS DETERMINED BASED ON CONTENTS OF THE ENTRY IN THE PAGE TABLE

FIG. 4

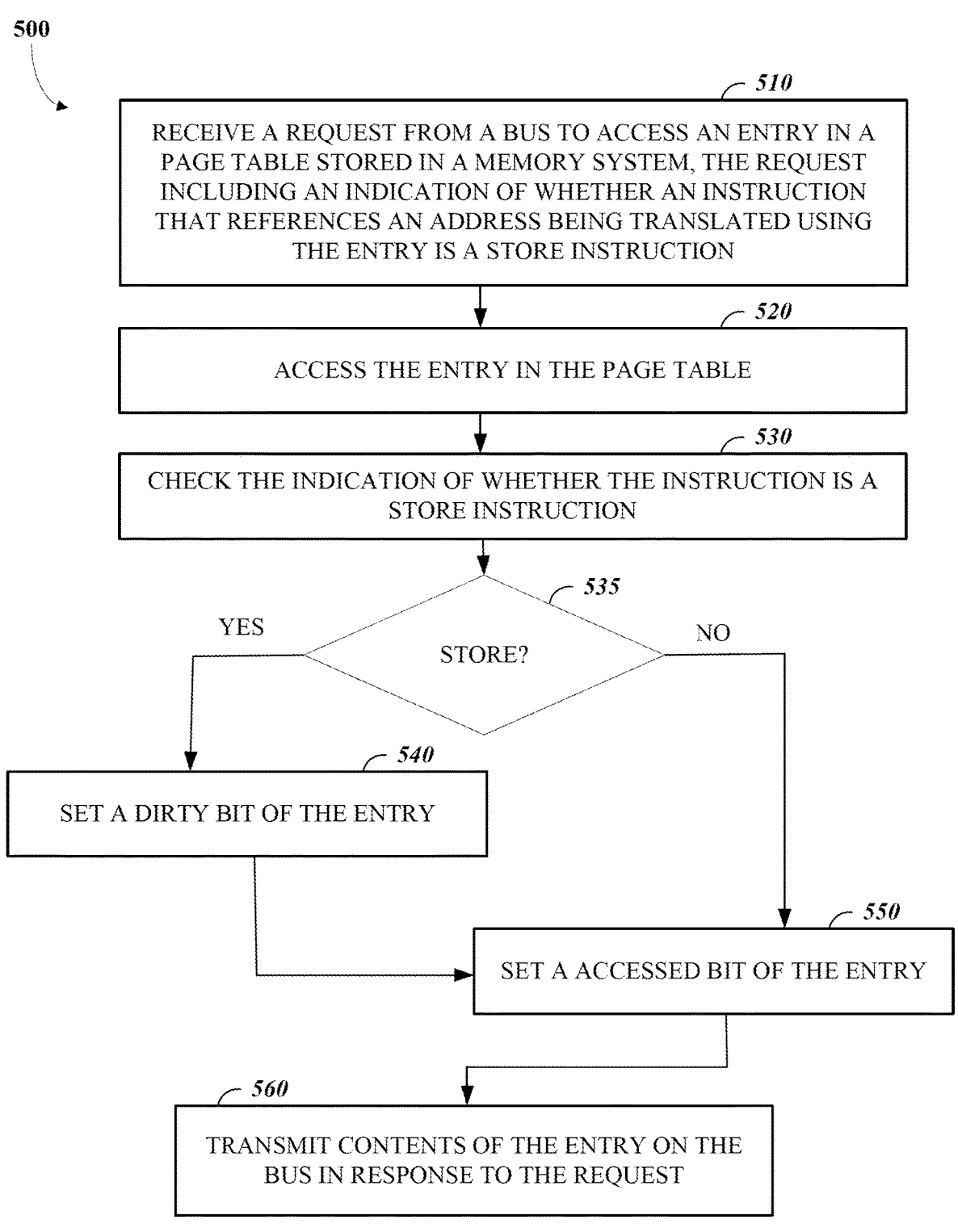

500

510

RECEIVE A REQUEST FROM A BUS TO ACCESS AN ENTRY IN A PAGE TABLE STORED IN A MEMORY SYSTEM, THE REQUEST INCLUDING AN INDICATION OF WHETHER AN INSTRUCTION THAT REFERENCES AN ADDRESS BEING TRANSLATED USING THE ENTRY IS A STORE INSTRUCTION

520

ACCESS THE ENTRY IN THE PAGE TABLE

530

CHECK THE INDICATION OF WHETHER THE INSTRUCTION IS A STORE INSTRUCTION

535

STORE?

YES

NO

540

SET A DIRTY BIT OF THE ENTRY

550

SET A ACCESSED BIT OF THE ENTRY

560

TRANSMIT CONTENTS OF THE ENTRY ON THE BUS IN RESPONSE TO THE REQUEST

FIG. 5

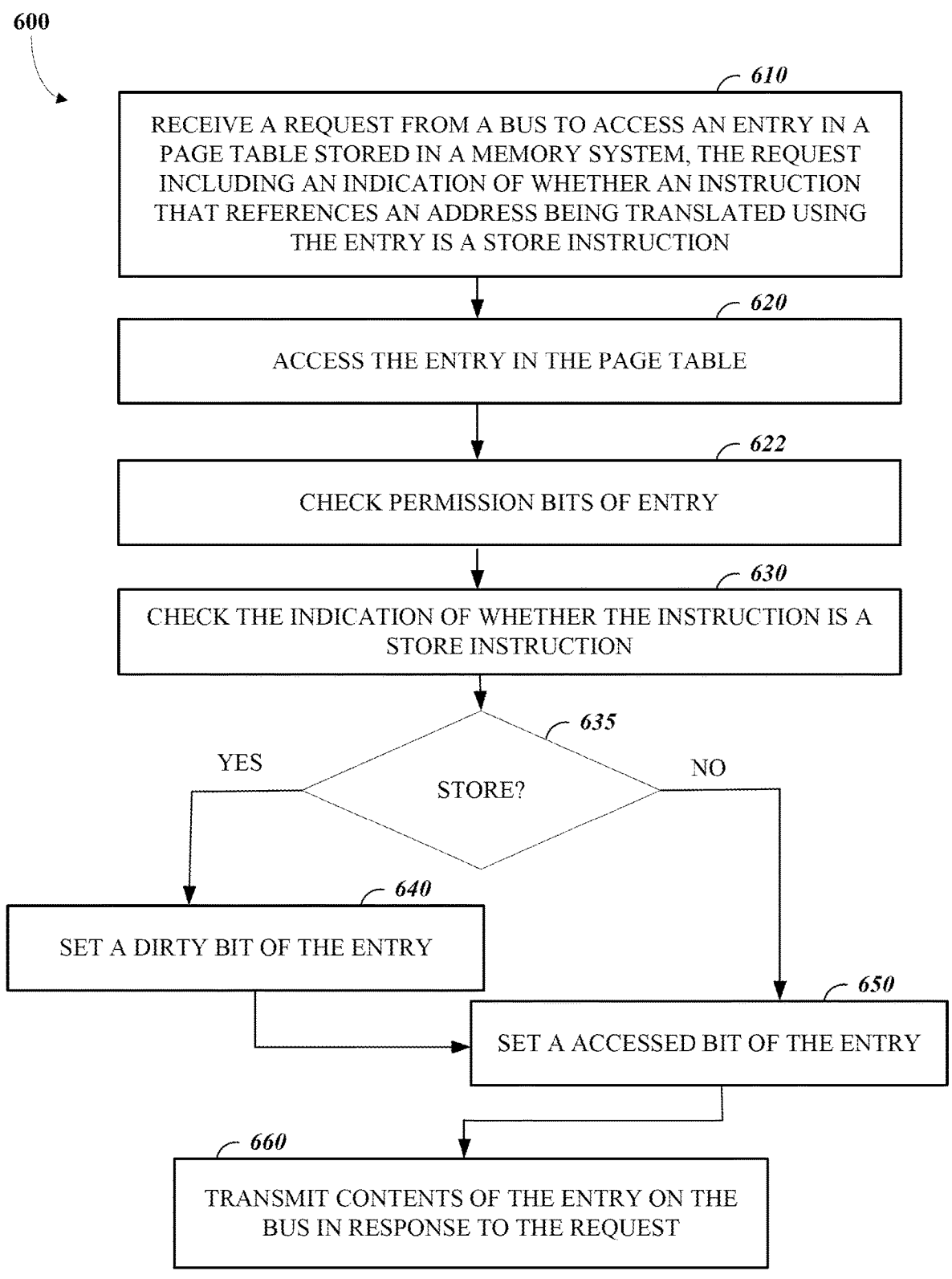

600

610

RECEIVE A REQUEST FROM A BUS TO ACCESS AN ENTRY IN A PAGE TABLE STORED IN A MEMORY SYSTEM, THE REQUEST INCLUDING AN INDICATION OF WHETHER AN INSTRUCTION THAT REFERENCES AN ADDRESS BEING TRANSLATED USING THE ENTRY IS A STORE INSTRUCTION

620

ACCESS THE ENTRY IN THE PAGE TABLE

622

CHECK PERMISSION BITS OF ENTRY

630

CHECK THE INDICATION OF WHETHER THE INSTRUCTION IS A STORE INSTRUCTION

635

STORE?

YES          NO

640

SET A DIRTY BIT OF THE ENTRY

650

SET A ACCESSED BIT OF THE ENTRY

660

TRANSMIT CONTENTS OF THE ENTRY ON THE BUS IN RESPONSE TO THE REQUEST

710
CHECK THE INDICATION OF WHETHER THE INSTRUCTION IS A
STORE INSTRUCTION

715
STORE?

YES

NO

720
CHECK A WRITE
PERMISSION OF THE ENTRY

730
CHECK THE INDICATION OF
WHETHER THE ADDRESS
BEING TRANSLATED USING
THE ENTRY IS FOR
INSTRUCTION FETCH

735
FETCH?

YES

NO

740
CHECK AN EXECUTE
PERMISSION OF THE ENTRY

750
CHECK A READ PERMISSION
OF THE ENTRY

900
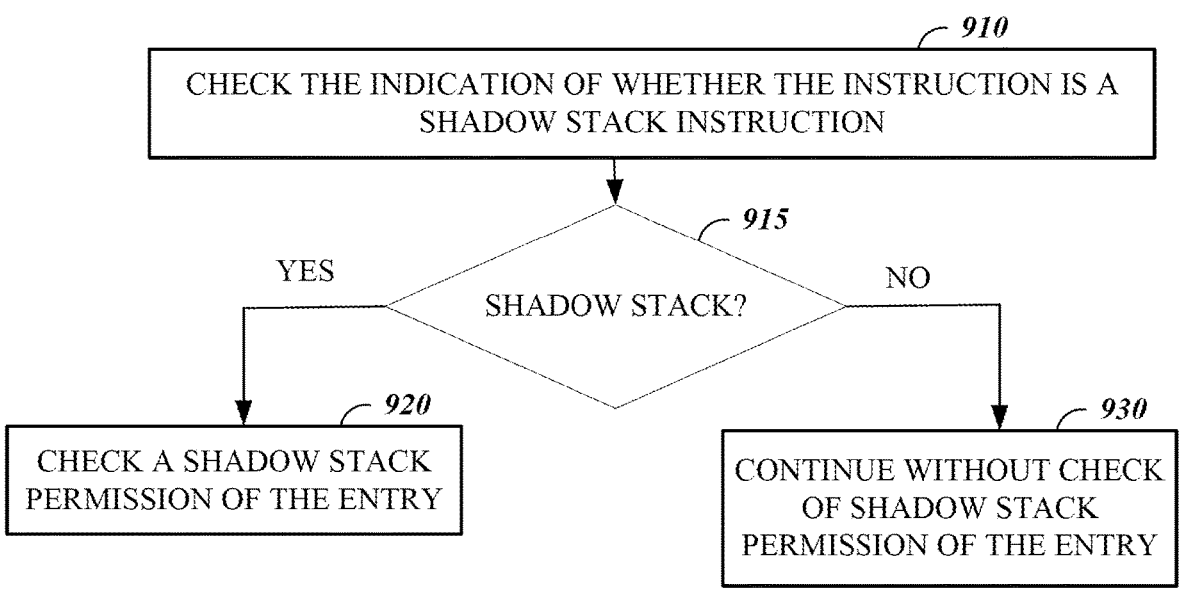
*910*
CHECK THE INDICATION OF WHETHER THE INSTRUCTION IS A
SHADOW STACK INSTRUCTION
*915*
YES          SHADOW STACK?          NO
*920*
CHECK A SHADOW STACK
PERMISSION OF THE ENTRY
*930*
CONTINUE WITHOUT CHECK
OF SHADOW STACK
PERMISSION OF THE ENTRY
FIG. 9

ATOMIC MEMORY OPERATIONS FOR ADDRESS TRANSLATION

CROSS-REFERENCE TO RELATED APPLICATION(S)

This application claims priority to and the benefit of U.S. Provisional Patent Application Ser. No. 63/411,094, filed Sep. 28, 2022, the entire disclosure of which is hereby incorporated by reference.

TECHNICAL FIELD

This disclosure relates to atomic memory operations for address translation.

BACKGROUND

An address translation engine is circuitry for translating virtual addresses into physical addresses in a memory system. For example, an address translation engine may access a page table stored in the memory system a step in translating an address. A page table can be used to map a virtual page number to a physical page number. A page table entry may store a variety of status fields (e.g., status bits) in addition to a physical page number. These status fields may be used by a memory management unit (MMU) to manage the usage of memory in a system on a chip (SOC). An input/output memory management unit (IOMMU) is a MMU that connects a direct memory access capable (DMA-capable) I/O bus to a main memory. Like a traditional MMU, which translates CPU-visible virtual addresses to physical addresses, the IOMMU maps device-visible virtual addresses, also called device addresses or I/O addresses, to physical addresses. Some units also provide memory protection from faulty or malicious devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a flow chart of an example of a process for sending a request for a page table entry that is used to translate an address, which in turn is used to access a resource at the translated address.

FIG. 5 is a flow chart of an example of a process for receiving a request for an entry in a page table that will be used to translate an address with data reflecting the nature of an instruction that will use the translated address and performing an atomic update of an accessed but and/or a dirty bit of the entry.

FIG. 6 is a flow chart of an example of a process for receiving a request for an entry in a page table that will be used to translate an address with data reflecting the nature of an instruction that will use the translated address and performing an atomic update of an accessed but and/or a dirty bit of the entry with a check of one or more permission bits in the entry.

FIG. 9 is a flow chart of an example of a process for checking a shadow stack permission bit of an entry.

DETAILED DESCRIPTION

Overview

Systems and methods are described herein that may be used to implement atomic memory operations for address translation. Page tables stored in memory are used to translate virtual addresses into physical addresses that can be used to access memory mapped resources (e.g., memory locations) in an integrated circuit. An address translation engine (e.g., in a translation lookaside buffer of a processor core or in an input/output memory management unit) performs the translation of a virtual address. To access an entry in a page table, and address translation engine may send a request via a bus to a memory system of the integrated circuit. An entry in the page table may include an accessed bit that indicates whether a virtual page associated with the entry has been accessed since a last time the accessed bit was cleared and a dirty bit indicating whether the virtual page associated with the entry has been written to since a last time the dirty bit was cleared. For example, these status bits for a virtual page kept in the page table may be used by operating system memory management functions. The status bits for a virtual page should be updated as needed before a resource on the page is accessed. One way to update the status bits is for the address translation engine to issue a first request across the bus to read the entry, apply logic to determine what the new state of the entry including the status bits should be, and then write an updated value to the entry in the page table with a second request across the bus. Bandwidth on the bus may be a scarce resource.

In some implementations, a request from an address translation engine in an integrated circuit for an entry in a page table includes an indication of whether an instruction that will use the address being translated is a load or a store. Circuitry in the memory system receives the request and uses information in the request to atomically update an accessed bit and/or a dirty bit of the entry in the page table. In some implementations, the circuitry in the memory system checks one or more permission bits of the entry in the page table.

Some implementations may provide advantages over conventional systems for address translation, such as, for example, reducing the number of requests to read an entry of a page table to perform an address translation, reducing the bus bandwidth used for address translations, and/or increasing the speed/performance of an address translation engine in some conditions.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

Details

Figure 1:
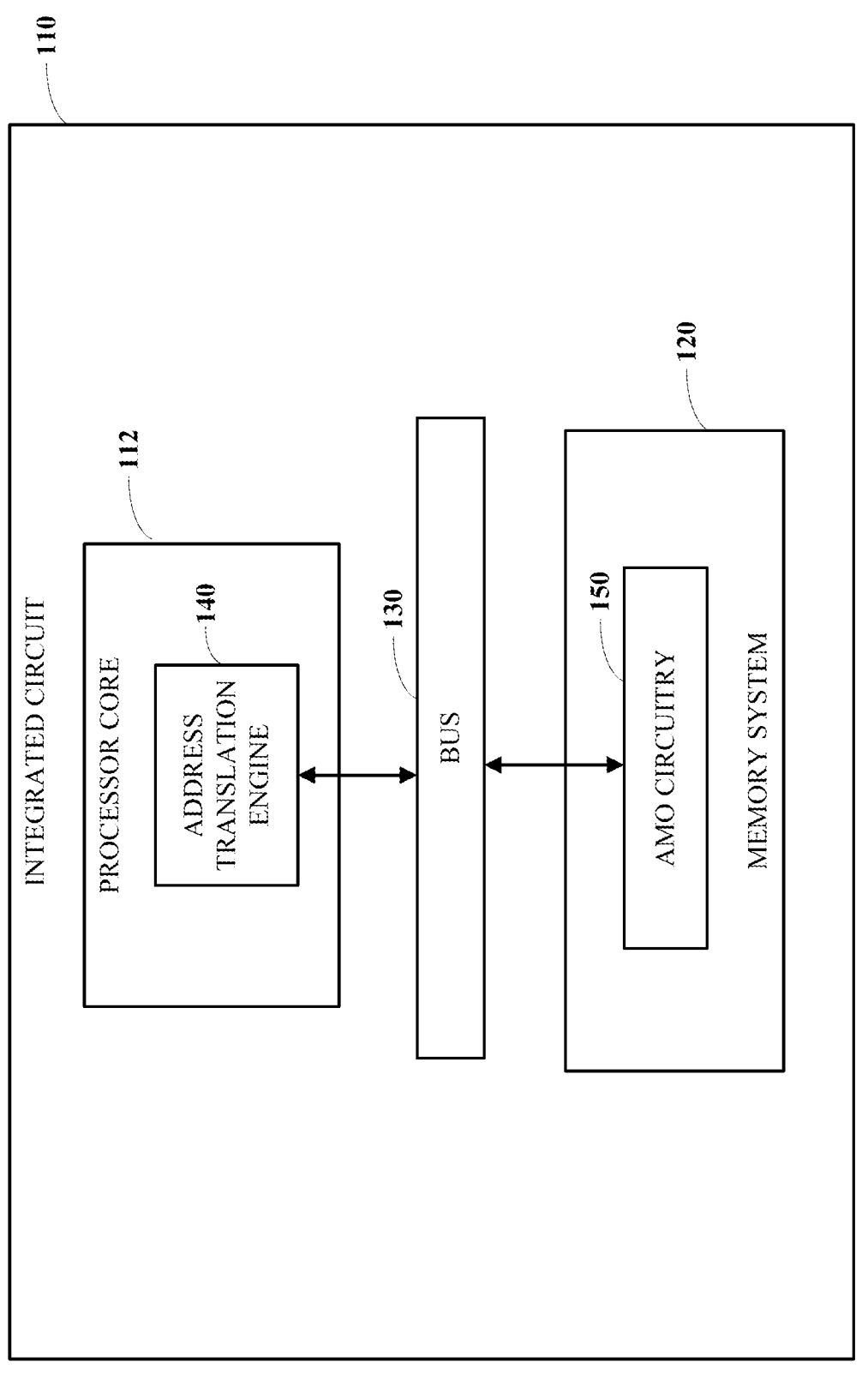
FIG. 1 is a block diagram of an example of an integrated circuit for enabling atomic memory operations for address translation.

FIG. 1 is a block diagram of an example of an integrated circuit 110 for enabling atomic memory operations for address translation. The integrated circuit 110 includes a processor core 112, a memory system 120, and a bus 130 connected to the memory system 120. The processor core 112 includes an address translation engine 140 connected to the bus 130. The address translation engine 140 is configured to generate requests on the bus 130 to access entries in a page table stored in the memory system 120. The memory system 120 includes an atomic memory operation circuitry 150. The atomic memory operation circuitry 150 is configured to receive a request from the bus, access an entry in the page table, update an accessed bit and/or a dirty bit of the entry based on the request, and transmit contents of the entry on the bus in response to the request. A request generated by the address translation engine 140 includes an indication of whether an instruction that references an address being translated using the entry is a store instruction. The atomic memory operation circuitry 150 may check the indication to determine whether the dirty bit of the entry in the page table should be updated. Updating the accessed bit and/or the dirty bit of an entry in the page table based on an initial request to access the entry for an address translation may reduce the number of requests to read an entry of a page table to perform an address translation, reducing the bus bandwidth used for address translations and/or increasing the speed/performance of the address translation engine 140 in some conditions. For example, the integrated circuit 110 may be used to implement the process 400 of FIG. 4. For example, the integrated circuit 110 may be used to implement the process 500 of FIG. 5. For example, the integrated circuit 110 may be used to implement the process 600 of FIG. 6. For example, the integrated circuit 110 may be used to implement the process 700 of FIG. 7. For example, the integrated circuit 110 may be used to implement the process 900 of FIG. 9.

The integrated circuit 110 includes a processor core 112 configured to execute instructions of an instruction set architecture. For example, the instruction set architecture may be a RISC-V instruction set architecture.

The integrated circuit 110 includes a memory system 120, which may include memory storing instructions and data and/or provide access to memory external to the integrated circuit 110 that stores instructions and/or data. The memory system 120 stores a page table, which may be used for performing address translations. For example, the memory system 120 may include random access memory. In some implementations, the memory system 120 includes one or more caches and an entry in the page table is accessed via the one or more caches. For example, the memory system 120 may include an L2 cache, which may be configured to implement a cache coherency protocol/policy to maintain cache coherency across multiple L1 caches. Although not shown in FIG. 1, the integrated circuit 110 may include multiple processor cores in some implementations. For example, the memory system 120 may include multiple layers.

The integrated circuit 110 includes a bus 130 connected to the memory system 120. The bus 130 enables communication between the processor core 112 and various other components of the integrated circuit 110, including the memory system 120. For example, the bus 130 may be a Tilelink bus or a PCIE bus.

The integrated circuit 110 includes an address translation engine 140 connected to the bus 130. The address translation engine 140 is configured to generate a request on the bus 130 to access an entry in a page table stored in the memory system 120. For example, the entry in the page table may be the entry 300 of FIG. 3, which is used for translation of virtual addresses into physical addresses. The request includes an indication of whether an instruction that references an address being translated using the entry is a store instruction. In some implementations, the request may also include an indication of whether an instruction that references the address being translated using the entry is a load instruction or whether the address being translated using the entry is being used for instruction fetch. The indication may provide information that can be used to atomically update one or more status bits of the entry in the page table while accessing the page table. For example, the address translation engine 140 may be part of a translation lookaside buffer.

The integrated circuit 110 includes an atomic memory operation circuitry 150 of the memory system 120 configured to receive the request from the bus and access the entry in the page table. The entry may include an accessed bit indicating whether a virtual page associated with the entry has been accessed since a last time the accessed bit was cleared and a dirty bit indicating whether the virtual page associated with the entry has been written to since a last time the dirty bit was cleared. The atomic memory operation circuitry 150 is configured to transmit contents of the entry on the bus 130 in response to the request. The contents of the entry (e.g., including a physical page number) may be used by the address translation engine 140 to perform an address translation. The atomic memory operation circuitry 150 may be configured to check the indication of whether the instruction that references the address being translated using the entry is a store instruction; and, responsive to the indication indicating that the instruction is a store instruction, set the dirty bit of the entry in the page table. The atomic memory operation circuitry 150 may be configured to set the dirty bit prior to transmitting contents of the entry on the bus 130 in response to the request. The atomic memory operation circuitry may be configured to set the accessed bit prior to transmitting contents of the entry on the bus 130 in response to the request. The atomic memory operation circuitry 150 may be configured to check permission bits of the entry prior to transmitting contents of the entry on the bus 130 in response to the request. For example, the atomic memory operation circuitry 150 may be configured to check the indication of whether the instruction that references the address being translated using the entry is a store instruction; and, responsive to the indication indicating that the instruction is a store instruction, check a write permission bit of the entry. In some implementations, the atomic memory operation circuitry 150 is integrated with a cache of the memory system 120.

Figure 2:
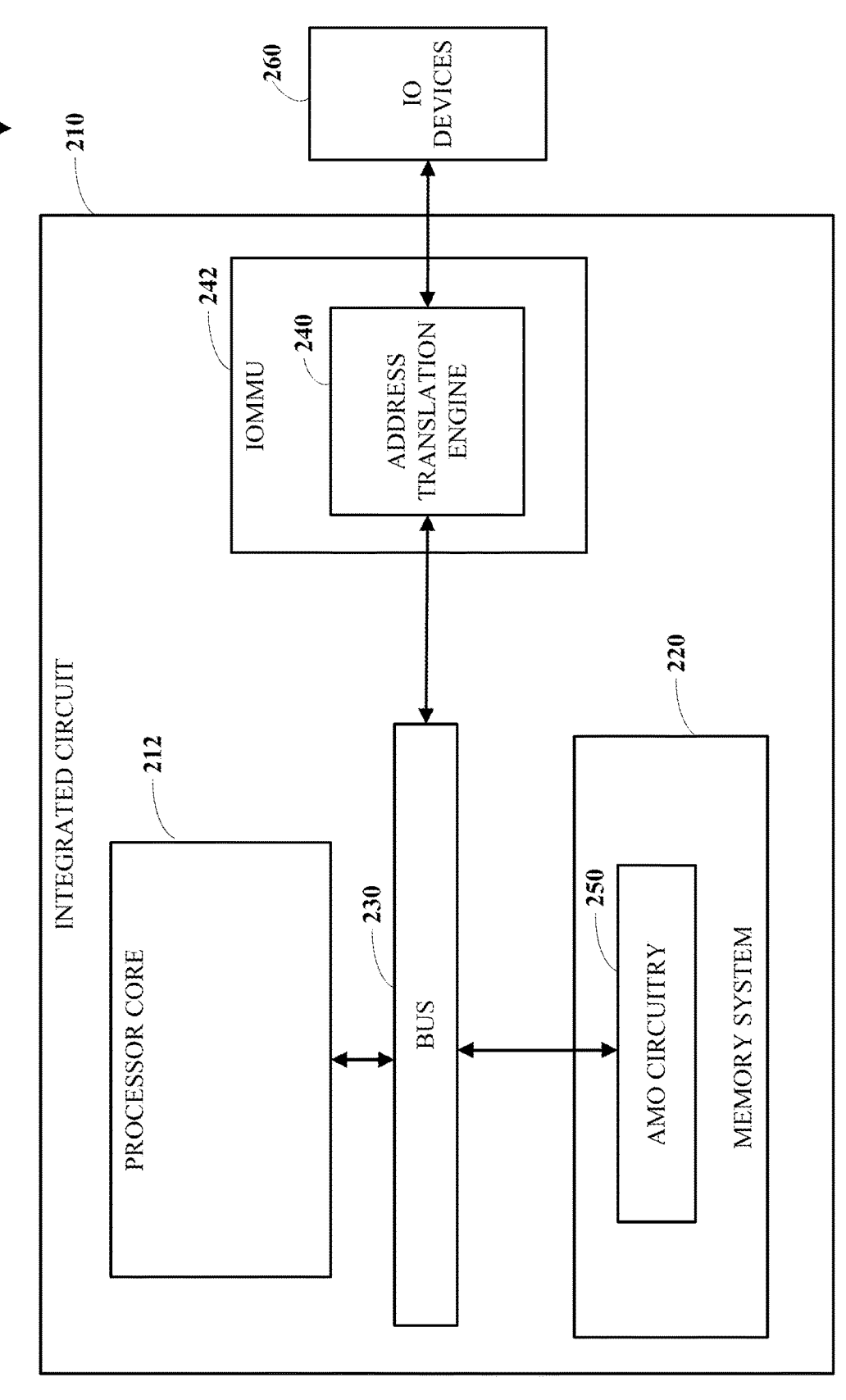
FIG. 2 is a block diagram of an example of a system for enabling atomic memory operations for address translation to support memory mapped input/output.

FIG. 2 is a block diagram of an example of a system 200 for enabling atomic memory operations for address translation to support memory mapped input/output. The system 200 includes an integrated circuit 210 and one or more input/output devices 260. The integrated circuit 210 includes a processor core 212, a memory system 220, and a bus 230 connected to the memory system 220. The integrated circuit 210 includes an address translation engine 240 connected to the bus 230. The address translation engine 240 is part of an input/output memory management unit 242. For example, the one or more input/output devices 260 may access the memory system 220 using the address translation engine 240. The address translation engine 240 is configured to generate requests on the bus 230 to access entries in a page table stored in the memory system 220. The memory system 220 includes an atomic memory operation circuitry 250. The atomic memory operation circuitry 250 is configured to receive a request from the bus, access an entry in the page table, update an accessed bit and/or a dirty bit of the entry based on the request, and transmit contents of the entry on the bus in response to the request. A request generated by the address translation engine 240 includes an indication of whether an instruction that references an address being translated using the entry is a store instruction. The atomic memory operation circuitry 250 may check the indication to determine whether the dirty bit of the entry in the page table should be updated. Updating the accessed bit and/or the dirty bit of an entry in the page table based on an initial request to access the entry for an address translation may reduce the number of requests to read an entry of a page table to perform an address translation, reducing the bus bandwidth used for address translations and/or increasing the speed/performance of the address translation engine 240 in some conditions. For example, the integrated circuit 210 may be used to implement the process 400 of FIG. 4. For example, the integrated circuit 210 may be used to implement the process 500 of FIG. 5. For example, the integrated circuit 210 may be used to implement the process 600 of FIG. 6. For example, the integrated circuit 210 may be used to implement the process 700 of FIG. 7. For example, the integrated circuit 210 may be used to implement the process 900 of FIG. 9.

The integrated circuit 210 includes a processor core 212 configured to execute instructions of an instruction set architecture. For example, the instruction set architecture may be a RISC-V instruction set architecture.

The integrated circuit 210 includes a memory system 220, which may include memory storing instructions and data and/or provide access to memory external to the integrated circuit 210 that stores instructions and/or data. The memory system 220 stores a page table, which may be used for performing address translations. For example, the memory system 220 may include random access memory. In some implementations, the memory system 220 includes one or more caches and an entry in the page table is accessed via the one or more caches. For example, the memory system 220 may include an L2 cache, which may be configured to implement a cache coherency protocol/policy to maintain cache coherency across multiple L1 caches. Although not shown in FIG. 2, the integrated circuit 210 may include multiple processor cores in some implementations. For example, the memory system 220 may include multiple layers.

The integrated circuit 210 includes a bus 230 connected to the memory system 220. The bus 230 enables communication between the processor core 212 and various other components of the integrated circuit 210, including the memory system 220 and the input/output memory management unit 242. For example, the bus 230 may be a Tilelink bus or a PCIE bus.

The integrated circuit 210 includes an address translation engine 240 connected to the bus 230. The address translation engine 240 is configured to generate a request on the bus 230 to access an entry in a page table stored in the memory system 220. For example, the entry in the page table may be the entry 300 of FIG. 3, which is used for translation of virtual addresses into physical addresses. The request includes an indication of whether an instruction that references an address being translated using the entry is a store instruction. In some implementations, the request may also include an indication of whether an instruction that references the address being translated using the entry is a load instruction or whether the address being translated using the entry is being used for instruction fetch. The indication may provide information that can be used to atomically update one or more status bits of the entry in the page table while accessing the page table. In this example, the address translation engine 240 is part of an input/output memory management unit 242. For example, the address translation engine 240 may be part of a translation lookaside buffer in the input/output memory management unit 242.

The address translation engine 240 is integrated in between the one or more input/output devices 260 and the bus 130. For example, the one or more input/output devices 260 may include a GPU for graphics, a storage controller, a NIC, and/or IO accelerators, such as an encryption accelerator or DSPs, which might have a direct memory access (DMA) interface to memory of the system 200. A purpose of the address translation engine 240 may be to both translate device virtual addresses to physical addresses for device DMA requests and to perform memory protection for such requests.

For example, the address translation engine 240 may be used to facilitate DMA traffic from the one or more input/output devices 260. The address translation engine 240 may be integrated in an input/output memory management unit 242 in order to comply with requirements of a system on a chip (SOC). The role of this input/output memory management unit 242 may differ from SOC to SOC but it may have to handle request reordering, error handling, and/or specific attribute management.

In an example, a device DMA requests to the memory system 120, which may be referred to as inbound transactions, can be processed by the address translation engine 240. In some implementations, outbound transactions, from the processor core 212 to the one or more input/output devices 260, are not managed by the address translation engine 240, as the address of the transaction is already physical (e.g., as translated by the hart's memory management unit (MMU)). An inbound address translation request may be associated with a privilege level, a virtualization mode, and a translation mode, which can be indicated by a translation tag that can be used to efficiently associate data of the address translation engine 240 used to implement the various kinds of address translations supported by the system.

The integrated circuit 210 includes an atomic memory operation circuitry 250 of the memory system 220 configured to receive the request from the bus and access the entry in the page table. The entry may include an accessed bit indicating whether a virtual page associated with the entry has been accessed since a last time the accessed bit was cleared and a dirty bit indicating whether the virtual page associated with the entry has been written to since a last time the dirty bit was cleared. The atomic memory operation circuitry 250 is configured to transmit contents of the entry on the bus 230 in response to the request. The contents of the entry (e.g., including a physical page number) may be used by the address translation engine 240 to perform an address translation. The atomic memory operation circuitry 250 may be configured to check the indication of whether the instruction that references the address being translated using the entry is a store instruction; and, responsive to the indication indicating that the instruction is a store instruction, set the dirty bit of the entry in the page table. The atomic memory operation circuitry 250 may be configured to set the dirty bit prior to transmitting contents of the entry on the bus 230 in response to the request. The atomic memory operation circuitry may be configured to set the accessed bit prior to transmitting contents of the entry on the bus 230 in response to the request. The atomic memory operation circuitry 250 may be configured to check permission bits of the entry prior to transmitting contents of the entry on the bus 230 in response to the request. For example, the atomic memory operation circuitry 250 may be configured to check the indication of whether the instruction that references the address being translated using the entry is a store instruction; and, responsive to the indication indicating that the instruction is a store instruction, check a write permission bit of the entry. In some implementations, the atomic memory operation circuitry 250 is integrated with a cache of the memory system 220.

Figure 3:
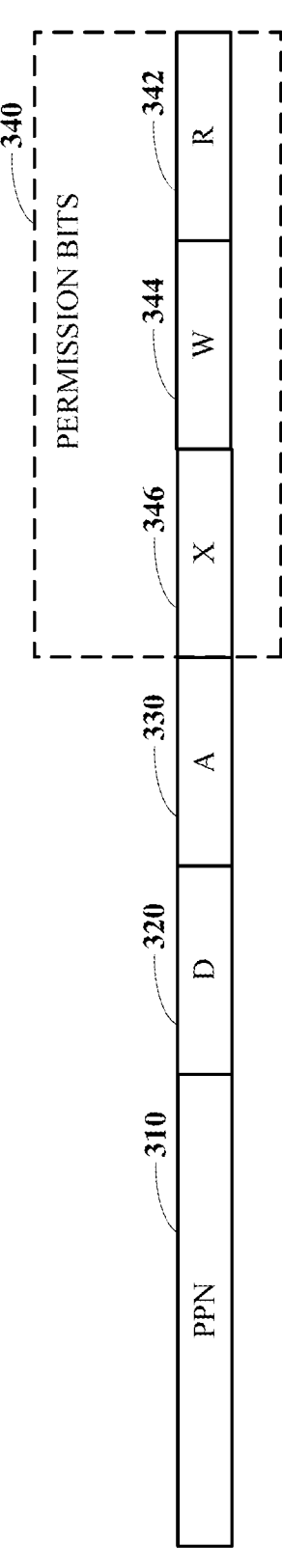
FIG. 3 is a memory map diagram of an example of an entry in a page table used for translation of virtual addresses into physical addresses.

FIG. 3 is a memory map diagram of an example of an entry 300 in a page table used for translation of virtual addresses into physical addresses. The entry 300 includes a physical page number 310. The entry 300 includes an accessed bit 330 indicating whether a virtual page associated with the entry has been accessed since a last time the accessed bit 330 was cleared and a dirty bit 320 indicating whether the virtual page associated with the entry has been written to since a last time the dirty bit 320 was cleared. The entry 300 includes permission bits 340, including a read bit 342, a write bit 344, and an execute bit 346.

For example, the entry 300 may be formatted for Sv32. The permission bits 340 indicate whether the page is readable, writable, and executable, respectively. When all three permission bits 340 are zero, the entry 300 is a pointer to the next level of the page table; otherwise, it is a leaf entry in the page table. In some implementations, attempting to fetch an instruction from a page that does not have execute permissions raises a fetch page-fault exception. Attempting to execute a load or load-reserved instruction whose effective address lies within a page without read permissions raises a load page-fault exception. Attempting to execute a store, store-conditional, or atomic memory operation instruction whose effective address lies within a page without write permissions may raise a store page-fault exception.

A leaf entry 300 contains an accessed bit 330 and dirty bit 320. The accessed bit 330 indicates the virtual page has been read, written, or fetched from since the last time the accessed bit 330 was cleared. The dirty bit 320 indicates the virtual page has been written since the last time the dirty bit 320 was cleared. In some implementations, when a virtual page is accessed and the accessed bit 330 is clear, or is written and the dirty bit 320 is clear, a page-fault exception is raised. In some implementations, when a virtual page is accessed and the accessed bit 330 is clear, or is written and the dirty bit 320 is clear, the implementation sets the corresponding bit(s) in the entry 300. The entry 300 update may be atomic with respect to other accesses to the entry 300, and should atomically check that the entry 300 is valid and/or grants sufficient permissions. Updates of the accessed bit 330 may be performed as a result of speculation. In some implementations, updates to the dirty bit 320 are exact (i.e., not speculative), and observed in program order by the local hart. In some implementations, the entry 300 update may appear in the global memory order no later than the explicit memory access, or any subsequent explicit memory access to that virtual page by the local hart. The ordering on loads and stores provided by fence instructions and the acquire/release bits on atomic instructions may also order the entry updates associated with those loads and stores as observed by remote harts. Update of the entry 300 is not required to be atomic with respect to the explicit memory access that caused the update, and the sequence is interruptible. However, the hart should not perform the explicit memory access before the update of the entry 300 is globally visible.

In some implementations, bit updates of the accessed bit 330 are required to be exact, but allowing the accessed bit 330 to be updated as a result of speculation may simplify the implementation of address translation prefetchers. System software typically uses the accessed bit 330 as a page replacement policy hint, but does not require exactness for functional correctness. On the other hand, dirty bit 320 updates may still be required to be exact and performed in program order, as the dirty bit 320 may affect the functional correctness of page eviction. Implementations may choose to perform both accessed bit 330 and dirty bit 320 updates only in an exact manner. In both cases, implementing atomicity may ensure that the update of the entry 300 will not be interrupted by other intervening writes to the page table, as such interruptions could lead to accessed/dirty bits being set on entries in the page table that have been reused for other purposes, on memory that has been reclaimed for other purposes, and so on. Simple implementations may instead generate page-fault exceptions.

In some implementations (not shown in FIG. 3), the entry 300 includes one or more shadow stack permission bits to support shadow stack instructions that may restrict access to shadow stack data. A shadow stack may store duplicate copies of return addresses stored in a call stack that can be compared to the return address in the call stack when returning from a function call to maintain control-flow integrity by preventing attacks that try to change a return address stored in the call stack. In some implementations, attempting to execute a shadow stack instruction (e.g., a shadow stack push or a shadow stack pop instruction) whose effective address lies within a page without shadow stack permissions raises a page-fault exception.

FIG. 4 is a flow chart of an example of a process 400 for sending a request for a page table entry that is used to translate an address, which in turn is used to access a resource at the translated address. The process 400 includes generating 410 a request on a bus to access an entry in a page table stored in a memory system; receiving 420 a response to the request, including contents of the entry in the page table; and accessing 430 memory using an address determined based on contents of the entry in the page table. For example, the process 400 may be implemented using the integrated circuit 110 of FIG. 1. For example, the process 400 may be implemented using the integrated circuit 210 of FIG. 2.

The process 400 includes generating 410 a request on a bus to access an entry in a page table stored in a memory system. The request includes an indication of whether an instruction that references an address being translated using the entry is a store instruction. For example, the entry in the page table may be the entry 300 of FIG. 3, which is used for translation of virtual addresses into physical addresses. The indication may provide information that can be used to atomically update one or more status bits of the entry in the page table while accessing the page table. In some implementations, the request may also include an indication of whether an instruction that references the address being translated using the entry is a load instruction or whether the address being translated using the entry is being used for instruction fetch. For example, the address translation engine may be part of a translation lookaside buffer. In some implementations, the address translation engine is part of an input/output memory management unit.

FIG. 5 is a flow chart of an example of a process 500 for receiving a request for an entry in a page table that will be used to translate an address with data reflecting the nature of an instruction that will use the translated address and performing an atomic update of an accessed but and/or a dirty bit of the entry. The process 500 includes receiving 510 a request from a bus to access an entry in a page table stored in a memory system including an indication of whether an instruction that references an address being translated using the entry is a store instruction; accessing 520 the entry in the page table; and checking 530 the indication of whether the instruction that references the address being translated using the entry is a store instruction. At 535, if the instruction is a store, then the process 500 includes setting 540 a dirty bit of the entry in the page table and setting 550 an accessed bit of the entry in the page table. At 535, if the instruction is not a store, then the process 500 includes setting 550 an accessed bit of the entry in the page table. The process 500 includes transmitting 560 contents of the entry on the bus in response to the request. For example, the process 500 may be implemented using the integrated circuit 110 of FIG. 1. For example, the process 500 may be implemented using the integrated circuit 210 of FIG. 2.

The process 500 includes receiving 510 a request from a bus (e.g., a Tilelink bus or a PCIE bus) to access an entry in a page table stored in a memory system. The request includes an indication of whether an instruction that references an address being translated using the entry is a store instruction. For example, the request may be received 510 via the bus from an address translation engine (e.g., the address translation engine 140 or the address translation engine 240). For example, the request may be received 510 from a processor core (e.g., the processor core 112) of an integrated circuit. For example, the request may be received 510 from an input/output memory management unit (e.g., the input/output memory management unit 242) of an integrated circuit. For example, the request may be received 510 by an atomic memory operation circuitry (e.g., the atomic memory operation circuitry 150). For example, the request may be received 510 using a bus slave interface. The request may include an address (e.g., a supervisor virtual address (SVA), a guest physical address (GPA), or a guest virtual address (GVA)) to be translated. In some implementations, the request may also include an indication of whether an instruction that references the address being translated using the entry is a load instruction or whether the address being translated using the entry is being used for instruction fetch.

The process 500 includes accessing 520 the entry in the page table. The entry may include a dirty bit indicating whether a virtual page associated with the entry has been written to since a last time the dirty bit was cleared. The entry may include an accessed bit indicating whether a virtual page associated with the entry has been accessed since a last time the accessed bit was cleared. The entry may include permission bits (e.g., a readable bit, a writeable bit, and/or an executable bit). In some implementations, the memory system includes one or more caches and the entry in the page table is accessed 520 via the one or more caches. For example, the entry in the page table may be the entry 300 of FIG. 3.

The process 500 includes checking 530 the indication of whether the instruction that references the address being translated using the entry is a store instruction. At 535, if the instruction is a store, then the process 500 includes, responsive to the indication indicating that the instruction is a store instruction, setting 540 the dirty bit of the entry in the page table. The dirty bit may be set 540 prior to transmitting 560 contents of the entry on the bus in response to the request. At 535, if the instruction is not a store, then the process 500 includes setting 550 an accessed bit of the entry in the page table. The accessed bit may be set 550 prior to transmitting contents of the entry on the bus in response to the request. Setting 540 the dirty bit prior and/or setting 550 the accessed bit prior to transmitting 560 contents of the entry in response to the request may serve to make the update of the entry atomic with respect to the memory access instruction that caused the request to be issued.

The process 500 includes transmitting 560 contents of the entry on the bus in response to the request. For example, contents of the entry may be transmitted 560 via the bus to an address translation engine (e.g., the address translation engine 140 or the address translation engine 240) that generated the request. For example, the contents of the entry may be transmitted 560 to a processor core (e.g., the processor core 112) of an integrated circuit. For example, the contents of the entry may be transmitted 560 to an input/output memory management unit (e.g., the input/output memory management unit 242) of an integrated circuit. For example, the contents of the entry may be transmitted 560 by an atomic memory operation circuitry (e.g., the atomic memory operation circuitry 150). For example, the contents of the entry may be transmitted 560 using a bus master interface. The contents of the entry may include a physical page number of an address being translated.

FIG. 6 is a flow chart of an example of a process 600 for receiving a request for an entry in a page table that will be used to translate an address with data reflecting the nature of an instruction that will use the translated address and performing an atomic update of an accessed but and/or a dirty bit of the entry with a check of one or more permission bits in the entry. The process 600 includes receiving 610 a request from a bus to access an entry in a page table stored in a memory system including an indication of whether an instruction that references an address being translated using the entry is a store instruction; accessing 620 the entry in the page table; checking 622 permission bits of the entry in the page table; and checking 630 the indication of whether the instruction that references the address being translated using the entry is a store instruction. At 635, if the instruction is a store, then the process 600 includes setting 640 a dirty bit of the entry in the page table and setting 650 an accessed bit of the entry in the page table. At 635, if the instruction is not a store, then the process 600 includes setting 650 an accessed bit of the entry in the page table. The process 600 includes transmitting 660 contents of the entry on the bus in response to the request. For example, the process 600 may be implemented using the integrated circuit 110 of FIG. 1. For example, the process 600 may be implemented using the integrated circuit 210 of FIG. 2.

The process 600 includes receiving 610 a request from a bus (e.g., a Tilelink bus or a PCIE bus) to access an entry in a page table stored in a memory system. The request includes an indication of whether an instruction that references an address being translated using the entry is a store instruction. For example, the request may be received 610 via the bus from an address translation engine (e.g., the address translation engine 140 or the address translation engine 240). For example, the request may be received 610 from a processor core (e.g., the processor core 112) of an integrated circuit. For example, the request may be received 610 from an input/output memory management unit (e.g., the input/output memory management unit 242) of an integrated circuit. For example, the request may be received 610 by an atomic memory operation circuitry (e.g., the atomic memory operation circuitry 150). For example, the request may be received 610 using a bus slave interface. The request may include an address (e.g., a supervisor virtual address (SVA), a guest physical address (GPA), or a guest virtual address (GVA)) to be translated. In some implementations, the request may also include an indication of whether an instruction that references the address being translated using the entry is a load instruction or whether the address being translated using the entry is being used for instruction fetch.

The process 600 includes accessing 620 the entry in the page table. The entry may include a dirty bit indicating whether a virtual page associated with the entry has been written to since a last time the dirty bit was cleared. The entry may include an accessed bit indicating whether a virtual page associated with the entry has been accessed since a last time the accessed bit was cleared. The entry may include permission bits (e.g., a readable bit, a writeable bit, and/or an executable bit). In some implementations, the memory system includes one or more caches and the entry in the page table is accessed 620 via the one or more caches. For example, the entry in the page table may be the entry 300 of FIG. 3.

The process 600 includes checking 622 permission bits of the entry prior to transmitting 560 contents of the entry on the bus in response to the request. In some implementations, the process 600 includes checking the indication of whether the instruction that references the address being translated using the entry is a store instruction; and, responsive to the indication indicating that the instruction is a store instruction, checking 622 a write permission bit of the entry. For example, checking 622 permission bits of the entry may include implementing the process 700 of FIG. 7. In some implementations, the process 600 includes checking an indication of whether the instruction that references the address being translated using the entry is a shadow stack instruction; and, responsive to the indication indicating that the instruction is a shadow stack instruction, checking 622 a shadow stack permission bit of the entry. For example, checking 622 permission bits of the entry may include implementing the process 900 of FIG. 9. In some implementations, checking 622 the permission bits and finding a lack of the required permissions to support the instruction that caused the request may cause a page-fault exception to be raised. In some implementations, the request may include additional information related to the instruction that caused the request to be generated, such as a user-mode indication or privilege level, which may be checked 622 against corresponding permission data stored in the entry of the page table for a corresponding page of memory. For example, the entry may include a user-mode bit that indicates whether the corresponding page is accessible to applications running in user-mode (as opposed to a supervisor-mode or a machine-mode) and this user-mode bit may be checked 622 when the request indicates that the instruction that caused it is from a user-mode process.

The process 600 includes checking 630 the indication of whether the instruction that references the address being translated using the entry is a store instruction. At 635, if the instruction is a store, then the process 600 includes, responsive to the indication indicating that the instruction is a store instruction, setting 640 the dirty bit of the entry in the page table. The dirty bit may be set 640 prior to transmitting 660 contents of the entry on the bus in response to the request. At 635, if the instruction is not a store, then the process 600 includes setting 650 an accessed bit of the entry in the page table. The accessed bit may be set 650 prior to transmitting contents of the entry on the bus in response to the request. Setting 640 the dirty bit prior and/or setting 650 the accessed bit prior to transmitting 660 contents of the entry in response to the request may serve to make the update of the entry atomic with respect to the memory access instruction that caused the request to be issued.

The process 600 includes transmitting 660 contents of the entry on the bus in response to the request. For example, contents of the entry may be transmitted 660 via the bus to an address translation engine (e.g., the address translation engine 140 or the address translation engine 240) that generated the request. For example, the contents of the entry may be transmitted 660 to a processor core (e.g., the processor core 112) of an integrated circuit. For example, the contents of the entry may be transmitted 660 to an input/output memory management unit (e.g., the input/output memory management unit 242) of an integrated circuit. For example, the contents of the entry may be transmitted 660 by an atomic memory operation circuitry (e.g., the atomic memory operation circuitry 150). For example, the contents of the entry may be transmitted 660 using a bus master interface. The contents of the entry may include a physical page number of an address being translated.

Figure 7:
FIG. 7 is a flow chart of an example of a process for checking a permission bit of an entry.

FIG. 7 is a flow chart of an example of a process 700 for checking a permission bit of an entry. The process 700 includes checking 710 the indication of whether the instruction that references the address being translated using the entry is a store instruction. At 715, if the instruction is a store, then the process 700 includes, responsive to the indication indicating that the instruction is a store instruction, checking 720 a write permission bit (e.g., the write bit 344) of the entry. At 715, if the instruction is not a store, then the process 700 includes, checking 730 an indication of whether the address being translated using the entry is for instruction fetch. At 735, if the address being translated using the entry is for instruction fetch, then the process 700 includes, responsive to the indication indicating that the address being translated using the entry is for instruction fetch, checking 740 an execute permission bit (e.g., the execute bit 346) of the entry. At 735, if the address being translated is not for instruction fetch, then the process 700 includes, responsive to the indication indicating that the instruction is a load instruction, checking 750 a read permission bit (e.g., the read bit 342) of the entry. In some implementations, finding a lack of the required permissions to support the instruction that caused the request may cause a page-fault exception to be raised. For example, the process 700 may be implemented by an atomic memory operation circuitry (e.g., the atomic memory operation circuitry 150 or the atomic memory operation circuitry 250).

Figure 8:
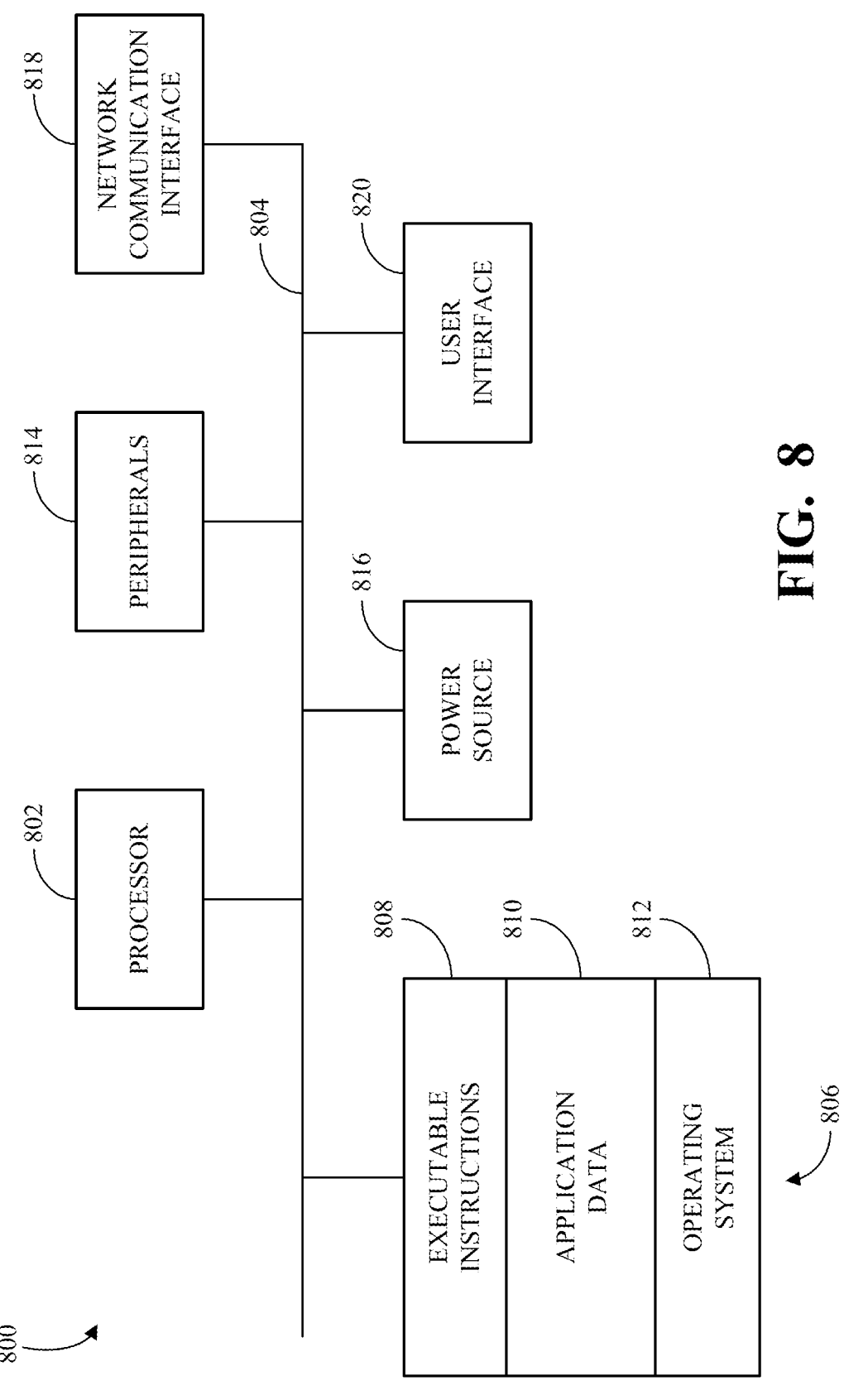
FIG. 8 is a block diagram of an example of a system for facilitating generation of a circuit representation.

FIG. 8 is a block diagram of an example of a system 800 for facilitating generation of a circuit representation. The system 800 is an example of an internal configuration of a computing device. For example, the system 800 may be used to generate a file that generates a circuit representation of an integrated circuit (e.g., the integrated circuit 110), including a processor core (e.g., the processor core 112), an address translation (e.g., the address translation engine 140), and an atomic memory operation circuitry (e.g., the atomic memory operation circuitry 150). The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information. For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more dynamic random-access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as random-access memory (RAM), and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®, an operating system for a small device, such as a smartphone or tablet device; or an operating system for a large device, such as a mainframe computer. The memory 806 can comprise one or more devices and can utilize one or more types of storage, such as solid-state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system 800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

FIG. 9 is a flow chart of an example of a process 900 for checking a shadow stack permission bit of an entry. The process 900 includes checking 910 the indication of whether the instruction that references the address being translated using the entry is a shadow stack instruction. At 915, if the instruction is a shadow stack instruction, then the process 900 includes, responsive to the indication indicating that the instruction is a shadow stack instruction, checking 920 a shadow stack permission bit of the entry. At 915, if the instruction is not a store, then the process 900 includes, continuing 930 without checking a shadow stack permission bit of the entry. In some implementations, finding a lack of the required shadow stack permissions to support the instruction that caused the request may cause a page-fault exception to be raised. For example, the process 900 may be implemented by an atomic memory operation circuitry (e.g., the atomic memory operation circuitry 150 or the atomic memory operation circuitry 250).

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in an integrated circuit for executing instructions that includes a memory system including random access memory; a bus connected to the memory system; and an address translation engine connected to the bus, wherein the address translation engine is configured to generate a request on the bus to access an entry in a page table stored in the memory system, wherein the request includes an indication of whether an instruction that references an address being translated using the entry is a store instruction.

In the first aspect, the integrated circuit may include an atomic memory operation circuitry of the memory system configured to receive the request from the bus; access the entry in the page table, wherein the entry includes an accessed bit indicating whether a virtual page associated with the entry has been accessed since a last time the accessed bit was cleared and a dirty bit indicating whether the virtual page associated with the entry has been written to since a last time the dirty bit was cleared; and transmit contents of the entry on the bus in response to the request.

In the first aspect, the atomic memory operation circuitry may be configured to check the indication of whether the instruction that references the address being translated using the entry is a store instruction; and, responsive to the indication indicating that the instruction is a store instruction, set the dirty bit of the entry in the page table. For example, the atomic memory operation circuitry may be configured to set the dirty bit prior to transmitting contents of the entry on the bus in response to the request. In the first aspect, the atomic memory operation circuitry may be configured to set the accessed bit prior to transmitting contents of the entry on the bus in response to the request. In the first aspect, the atomic memory operation circuitry may be configured to check the indication of whether the instruction that references the address being translated using the entry is a store instruction; and, responsive to the indication indicating that the instruction is a store instruction, check a write permission bit of the entry. In the first aspect, the request may include an indication of whether the instruction that references the address being translated using the entry is a shadow stack instruction, and the atomic memory operation circuitry may be configured to check the indication of whether the instruction that references the address being translated using the entry is a shadow stack instruction; and, responsive to the indication indicating that the instruction is a shadow stack instruction, check a shadow stack permission bit of the entry. In the first aspect, the atomic memory operation circuitry may be configured to check permission bits of the entry prior to transmitting contents of the entry on the bus in response to the request. In the first aspect, the atomic memory operation circuitry may be integrated with a cache of the memory system. In the first aspect, the memory system may include one or more caches and the entry in the page table may be accessed via the one or more caches. In the first aspect, the address translation engine may be part of a translation lookaside buffer. In the first aspect, the address translation engine may be part of an input/output memory management unit.

In a second aspect, the subject matter described in this specification can be embodied in methods that include generating a request on a bus to access an entry in a page table stored in a memory system, wherein the request includes an indication of whether an instruction that references an address being translated using the entry is a store instruction.

In the second aspect, the methods may include receiving the request from the bus; accessing the entry in the page table, wherein the entry includes an accessed bit indicating whether a virtual page associated with the entry has been accessed since a last time the accessed bit was cleared and a dirty bit indicating whether the virtual page associated with the entry has been written to since a last time the dirty bit was cleared; and transmitting contents of the entry on the bus in response to the request. In the second aspect, the methods may include checking the indication of whether the instruction that references the address being translated using the entry is a store instruction; and, responsive to the indication indicating that the instruction is a store instruction, setting the dirty bit of the entry in the page table. In the second aspect, the dirty bit may be set prior to transmitting contents of the entry on the bus in response to the request. In the second aspect, the methods may include setting the accessed bit prior to transmitting contents of the entry on the bus in response to the request. In the second aspect, the methods may include checking the indication of whether the instruction that references the address being translated using the entry is a store instruction; and, responsive to the indication indicating that the instruction is a store instruction, checking a write permission bit of the entry. In the second aspect, the methods may include checking permission bits of the entry prior to transmitting contents of the entry on the bus in response to the request. In the second aspect, the memory system may include one or more caches and the entry in the page table may be accessed via the one or more caches. In the second aspect, the request may include an indication of whether the instruction that references the address being translated using the entry is a shadow stack instruction, and the methods may include checking the indication of whether the instruction that references the address being translated using the entry is a shadow stack instruction; and, responsive to the indication indicating that the instruction is a shadow stack instruction, checking a shadow stack permission bit of the entry.

In a third aspect, the subject matter described in this specification can be embodied in a non-transitory computer readable medium comprising a circuit representation that, when processed by a computer, is used to program or manufacture an integrated circuit that includes a memory system including random access memory; a bus connected to the memory system; and an address translation engine connected to the bus, wherein the address translation engine is configured to generate a request on the bus to access an entry in a page table stored in the memory system, wherein the request includes an indication of whether an instruction that references an address being translated using the entry is a store instruction.

In the third aspect, the circuit representation, when processed by the computer, is used to program or manufacture the integrated circuit that may include an atomic memory operation circuitry of the memory system configured to receive the request from the bus; access the entry in the page table, wherein the entry includes an accessed bit indicating whether a virtual page associated with the entry has been accessed since a last time the accessed bit was cleared and a dirty bit indicating whether the virtual page associated with the entry has been written to since a last time the dirty bit was cleared; and transmit contents of the entry on the bus in response to the request. In the third aspect, the atomic memory operation circuitry may be configured to check the indication of whether the instruction that references the address being translated using the entry is a store instruction; and, responsive to the indication indicating that the instruction is a store instruction, set the dirty bit of the entry in the page table. In the third aspect, the atomic memory operation circuitry may be configured to set the dirty bit prior to transmitting contents of the entry on the bus in response to the request. In the third aspect, the atomic memory operation circuitry may be configured to set the accessed bit prior to transmitting contents of the entry on the bus in response to the request. In the third aspect, the atomic memory operation circuitry may be configured to check the indication of whether the instruction that references the address being translated using the entry is a store instruction; and, responsive to the indication indicating that the instruction is a store instruction, check a write permission bit of the entry. In the third aspect, the request may include an indication of whether the instruction that references the address being translated using the entry is a shadow stack instruction, and the atomic memory operation circuitry may be configured to check the indication of whether the instruction that references the address being translated using the entry is a shadow stack instruction; and, responsive to the indication indicating that the instruction is a shadow stack instruction, check a shadow stack permission bit of the entry. In the third aspect, the atomic memory operation circuitry may be configured to check permission bits of the entry prior to transmitting contents of the entry on the bus in response to the request. In the third aspect, the atomic memory operation circuitry may be integrated with a cache of the memory system. In the third aspect, the memory system may include one or more caches and the entry in the page table may be accessed via the one or more caches. In the third aspect, the address translation engine may be part of a translation lookaside buffer. In the third aspect, the address translation engine may be part of an input/output memory management unit.

In a fourth aspect, the subject matter described in this specification can be embodied in an integrated circuit for executing instructions that includes a memory system including random access memory; a bus connected to the memory system; and an atomic memory operation circuitry configured to receive a request from the bus to access an entry in a page table stored in the memory system, wherein the request includes an indication of whether an instruction that references an address being translated using the entry is a store instruction; access the entry in the page table; and transmit contents of the entry on the bus in response to the request.

In the fourth aspect, the entry may include a dirty bit indicating whether a virtual page associated with the entry has been written to since a last time the dirty bit was cleared, and the atomic memory operation circuitry may be configured to check the indication of whether the instruction that references the address being translated using the entry is a store instruction; and, responsive to the indication indicating that the instruction is a store instruction, set the dirty bit of the entry in the page table. In the fourth aspect, the atomic memory operation circuitry may be configured to set the dirty bit prior to transmitting contents of the entry on the bus in response to the request. In the fourth aspect, the entry may include an accessed bit indicating whether a virtual page associated with the entry has been accessed since a last time the accessed bit was cleared, and the atomic memory operation circuitry may be configured to set the accessed bit prior to transmitting contents of the entry on the bus in response to the request. In the fourth aspect, the atomic memory operation circuitry may be configured to check the indication of whether the instruction that references the address being translated using the entry is a store instruction; and, responsive to the indication indicating that the instruction is a store instruction, check a write permission bit of the entry. In the fourth aspect, the request may include an indication of whether the instruction that references the address being translated using the entry is a shadow stack instruction, and the atomic memory operation circuitry may be configured to check the indication of whether the instruction that references the address being translated using the entry is a shadow stack instruction; and, responsive to the indication indicating that the instruction is a shadow stack instruction, check a shadow stack permission bit of the entry. In the fourth aspect, the atomic memory operation circuitry may be configured to check permission bits of the entry prior to transmitting contents of the entry on the bus in response to the request. In the fourth aspect, the atomic memory operation circuitry may be integrated with a cache of the memory system. In the fourth aspect, the memory system may include one or more caches and the entry in the page table may be accessed via the one or more caches.

In a fifth aspect, the subject matter described in this specification can be embodied in methods that include receiving a request from a bus to access an entry in a page table stored in a memory system, wherein the request includes an indication of whether an instruction that references an address being translated using the entry is a store instruction; accessing the entry in the page table; and transmitting contents of the entry on the bus in response to the request.

In the fifth aspect, the entry may include a dirty bit indicating whether a virtual page associated with the entry has been written to since a last time the dirty bit was cleared, and the methods may include checking the indication of whether the instruction that references the address being translated using the entry is a store instruction; and, responsive to the indication indicating that the instruction is a store instruction, setting the dirty bit of the entry in the page table. In the fifth aspect, the dirty bit may be set prior to transmitting contents of the entry on the bus in response to the request. In the fifth aspect, the entry may include an accessed bit indicating whether a virtual page associated with the entry has been accessed since a last time the accessed bit was cleared, and the methods may include setting the accessed bit prior to transmitting contents of the entry on the bus in response to the request. In the fifth aspect, the methods may include checking the indication of whether the instruction that references the address being translated using the entry is a store instruction; and, responsive to the indication indicating that the instruction is a store instruction, checking a write permission bit of the entry. In the fifth aspect, the methods may include checking permission bits of the entry prior to transmitting contents of the entry on the bus in response to the request. In the fifth aspect, the memory system may include one or more caches and the entry in the page table may be accessed via the one or more caches. In the fifth aspect, the request may include an indication of whether the instruction that references the address being translated using the entry is a shadow stack instruction, and the methods may include checking the indication of whether the instruction that references the address being translated using the entry is a shadow stack instruction; and, responsive to the indication indicating that the instruction is a shadow stack instruction, checking a shadow stack permission bit of the entry.

In a sixth aspect, the subject matter described in this specification can be embodied in a non-transitory computer readable medium comprising a circuit representation that, when processed by a computer, is used to program or manufacture an integrated circuit that includes a memory system including random access memory; a bus connected to the memory system; and an atomic memory operation circuitry configured to receive a request from the bus to access an entry in a page table stored in the memory system, wherein the request includes an indication of whether an instruction that references an address being translated using the entry is a store instruction; access the entry in the page table; and transmit contents of the entry on the bus in response to the request.

In the sixth aspect, the entry may include a dirty bit indicating whether a virtual page associated with the entry has been written to since a last time the dirty bit was cleared, and the atomic memory operation circuitry may be configured to check the indication of whether the instruction that references the address being translated using the entry is a store instruction; and, responsive to the indication indicating that the instruction is a store instruction, set the dirty bit of the entry in the page table. In the sixth aspect, the atomic memory operation circuitry may be configured to set the dirty bit prior to transmitting contents of the entry on the bus in response to the request. In the sixth aspect, the entry may include an accessed bit indicating whether a virtual page associated with the entry has been accessed since a last time the accessed bit was cleared, and the atomic memory operation circuitry may be configured to set the accessed bit prior to transmitting contents of the entry on the bus in response to the request. In the sixth aspect, the atomic memory operation circuitry may be configured to check the indication of whether the instruction that references the address being translated using the entry is a store instruction; and, responsive to the indication indicating that the instruction is a store instruction, check a write permission bit of the entry. In the sixth aspect, the request may include an indication of whether the instruction that references the address being translated using the entry is a shadow stack instruction, and the atomic memory operation circuitry may be configured to check the indication of whether the instruction that references the address being translated using the entry is a shadow stack instruction; and, responsive to the indication indicating that the instruction is a shadow stack instruction, check a shadow stack permission bit of the entry. In the sixth aspect, the atomic memory operation circuitry may be configured to check permission bits of the entry prior to transmitting contents of the entry on the bus in response to the request. In the sixth aspect, the atomic memory operation circuitry may be integrated with a cache of the memory system. In the sixth aspect, the memory system may include one or more caches and the entry in the page table may be accessed via the one or more caches.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
a memory system including random access memory;
a bus connected to the memory system; and
an address translation engine connected to the bus, wherein the address translation engine is configured to:
generate a request on the bus to access an entry in a page table stored in the memory system, wherein the request includes an indication of whether an instruction that references an address being translated using the entry is a store instruction;
wherein the memory system is configured to:
receive the request from the bus;
access the entry in the page table, wherein the entry includes an accessed bit indicating whether a virtual page associated with the entry has been accessed since a last time the accessed bit was cleared and a dirty bit indicating whether the virtual page associated with the entry has been written to since a last time the dirty bit was cleared;
as part of a single, uninterrupted operation responsive to the request, set the dirty bit of the entry when the request includes the indication that the instruction is a store instruction; and
transmit contents of the entry on the bus in response to the request.

2. The integrated circuit of claim 1, further comprising:
an atomic memory operation circuitry of the memory system configured to perform the receiving, accessing, setting, and transmitting.

3. The integrated circuit of claim 2, in which the atomic memory operation circuitry is configured to:

check the indication of whether the instruction that references the address being translated using the entry is a store instruction.

4. The integrated circuit of claim 3, in which the atomic memory operation circuitry is configured to set the dirty bit prior to transmitting contents of the entry on the bus in response to the request.

5. The integrated circuit of claim 2, in which the atomic memory operation circuitry is configured to:

set the accessed bit prior to transmitting contents of the entry on the bus in response to the request.

6. The integrated circuit of claim 2, in which the atomic memory operation circuitry is configured to:

check the indication of whether the instruction that references the address being translated using the entry is a store instruction; and responsive to the indication indicating that the instruction is a store instruction, check a write permission bit of the entry.

7. The integrated circuit of claim 2, in which the atomic memory operation circuitry is configured to:

check permission bits of the entry prior to transmitting contents of the entry on the bus in response to the request.

8. The integrated circuit of claim 2, in which the atomic memory operation circuitry is integrated with a cache of the memory system.

9. The integrated circuit of claim 1, in which the request includes an indication of whether the instruction that references the address being translated using the entry is privileged or user-mode.

10. The integrated circuit of claim 1, in which the address translation engine is part of a translation lookaside buffer.

11. The integrated circuit of claim 1, in which the address translation engine is part of an input/output memory management unit.

12. A method comprising:

generating a request on a bus to access an entry in a page table stored in a memory system, wherein the request includes an indication of whether an instruction that references an address being translated using the entry is a store instruction;

receiving the request from the bus;

accessing the entry in the page table, wherein the entry includes an accessed bit indicating whether a virtual page associated with the entry has been accessed since a last time the accessed bit was cleared and a dirty bit indicating whether the virtual page associated with the entry has been written to since a last time the dirty bit was cleared;

as part of a single, uninterrupted operation responsive to the request, setting the dirty bit of the entry when the request includes the indication that the instruction is a store instruction; and transmitting contents of the entry on the bus in response to the request.

13. The method of claim 12, wherein the receiving, accessing, setting, and transmitting are performed by an atomic memory operation circuitry.

14. The method of claim 12, further comprising:

checking the indication of whether the instruction that references the address being translated using the entry is a store instruction.

15. The method of claim 12, further comprising:

setting the accessed bit prior to transmitting contents of the entry on the bus in response to the request.

16. The method of claim 12, further comprising:

checking the indication of whether the instruction that references the address being translated using the entry is a store instruction; and responsive to the indication indicating that the instruction is a store instruction, checking a write permission bit of the entry.

17. A non-transitory computer readable medium comprising a circuit representation that, when processed by a computer, is used to program or manufacture an integrated circuit comprising:

a memory system including random access memory;

a bus connected to the memory system; and an address translation engine connected to the bus, wherein the address translation engine is configured to:

generate a request on the bus to access an entry in a page table stored in the memory system, wherein the request includes an indication of whether an instruction that references an address being translated using the entry is a store instruction;

wherein the memory system is configured to:

receive the request from the bus;

access the entry in the page table, wherein the entry includes an accessed bit indicating whether a virtual page associated with the entry has been accessed since a last time the accessed bit was cleared and a dirty bit indicating whether the virtual page associated with the entry has been written to since a last time the dirty bit was cleared;

as part of a single, uninterrupted operation responsive to the request, set the dirty bit of the entry when the request includes the indication that the instruction is a store instruction; and transmit contents of the entry on the bus in response to the request.

18. The non-transitory computer readable medium of claim 17, wherein the receiving, accessing, setting, and transmitting are performed by an atomic memory operation circuitry the circuit representation, when processed by the computer, is used to program or manufacture the integrated circuit comprising:

an atomic memory operation circuitry of the memory system configured to:

access the entry in the page table, wherein the entry includes an accessed bit indicating whether a virtual page associated with the entry has been accessed since a last time the accessed bit was cleared and the dirty bit indicating whether the virtual page associated with the entry has been written to since a last time the dirty bit was cleared; and transmit contents of the entry on the bus in response to the request.

* * * * *